(12) United States Patent
Bowen

(10) Patent No.: US 6,774,868 B1
(45) Date of Patent: Aug. 10, 2004

(54) METHOD FOR TILING MULTIPLE DISPLAYS TO GENERATE A LARGE AREA DISPLAY OF MOVING DATA

(75) Inventor: Andrew D. Bowen, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/232,860

(22) Filed: Jan. 15, 1999

(51) Int. Cl.$^7$ ................................................. G09G 5/00
(52) U.S. Cl. ........................................ 345/1.1; 345/1.3
(58) Field of Search ............................... 345/1, 2, 903, 345/507, 508, 1.1, 530, 1.3, 103; 348/750, 751, 383; 358/1.11

(56) References Cited

U.S. PATENT DOCUMENTS

| | | | | |
|---|---|---|---|---|
| 4,734,779 A | * | 3/1988 | Levis et al. ..................... | 345/1 |
| 4,975,691 A | * | 12/1990 | Lee ................................. | 345/9 |
| 5,122,870 A | * | 6/1992 | Takeda et al. ............... | 348/751 |
| 5,544,338 A | * | 8/1996 | Forslund ....................... | 345/508 |
| 5,748,986 A | * | 5/1998 | Butterfield et al. .......... | 345/507 |
| 5,754,750 A | * | 5/1998 | Butterfield et al. .......... | 345/418 |
| 6,175,440 B1 | * | 1/2001 | Conemac ..................... | 348/750 |
| 6,177,920 B1 | * | 1/2001 | Koyama et al. ............. | 345/100 |
| 6,219,022 B1 | * | 4/2001 | Yamazaki et al. .......... | 345/103 |

* cited by examiner

Primary Examiner—Michael Razavi
Assistant Examiner—Chante' Harrison
(74) Attorney, Agent, or Firm—Woodcock Washburn LLP

(57) ABSTRACT

A method for tiling multiple displays to generate a large area display of moving data. Specifically, one embodiment of the present invention includes a system for generating a large area display of moving data. The system comprises a display image generator for rendering pixels of an image to be displayed as the large area display. Furthermore, a plurality of tiled image projectors are coupled to the display image generator to receive pixel data and to generate the large area display. The plurality of tiled image projectors comprise at least two image projectors. A first image projector which performs a first type of raster scanning sequence to display a first portion of the pixel data. Moreover, a second image projector which performs a second type of raster scanning sequence to display a second portion of the pixel data, wherein the second type of raster scanning sequence is different than the first type of raster scanning sequence. Therefore, the present invention provides a method and system for tiling multiple image projectors to generate a large area display of moving images and data which is free of visual defects or anomalies. As such, the present invention is able to produce large area displays exhibiting more realistic and lifelike images thereby improving the viewing experience of the viewer.

54 Claims, 9 Drawing Sheets

METHOD FOR TILING MULTIPLE DISPLAYS TO GENERATE A LARGE AREA DISPLAY OF MOVING DATA

TECHNICAL FIELD

The present invention relates to the field of displaying images and data. More specifically, the present invention relates to the field of large area displays.

BACKGROUND ART

Currently, there is a wide variety of devices and techniques utilized to visually display analog and/or digital signals containing moving images, data, and the like, thereby enabling people to view this information. Many of these display devices are very familiar to the general public. For instance, moving images and data are visually displayed on television sets, computer monitors, and arcade video games, to name a few. It should be appreciated that there are many different technologies which are utilized to implement these type of display devices. Some of these technologies include a cathode ray tube (CRT), a liquid crystal display (LCD), a laser based system, a reflective LCD, and a plasma display.

Furthermore, there are other existing techniques and technologies which are utilized to display moving images and data on a much larger scale than those mention above. For example, one technique for generating a large area display involves fabricating a "PowerWall" which is made-up of an array of projectors, each displaying a specific portion of the overall viewable image. Another technique for generating a large area display is similar to the PowerWall approach, except it involves the use of CRT monitors instead of projectors. Basically, a large area display is generated by utilizing an array of image projectors, each projecting a specific portion of the overall viewable image onto a desired surface. This technique is commonly referred to as "tiling".

In order to more fully understand how a prior art large area display is generated utilizing tiled image projectors, a more detail description is presented. For simplicity, the generation of a single projected image by an image projector is initially described. It should be appreciated that each image projector generating a portion of the large area display operates in the same fashion. FIG. 1A is a diagram illustrating the manner in which a projected image 100 is typically generated by a prior art image projector (not shown), which is well known by those of ordinary skill in the art. Fundamentally, the image projector raster scans or "draws" the pixels of image 100 in a row, from left to right. Furthermore, the image projector raster scans the rows of pixels of image 100 from top to bottom. Once the bottom row of pixels of image 100 is raster scanned, the image projector returns to the upper left-hand corner to begin raster scanning the top row of pixels again. In this fashion, the image projector continually generates and updates image 100 by repeating the process described above.

Specifically, to generate projected image 100, the image projector starts raster scanning pixel 102, which is located in the upper left-hand corner of image 100. The image projector proceeds to raster scan all of the pixels, from left to right, located in the top row of image 100. Upon reaching pixel 104, which is the right most pixel of the top row, the image projector stops raster scanning and proceeds to the left-hand edge of image 100 to begin raster scanning the next row of pixels. The image projector continues this process for each subsequent row of pixels until it reaches pixel 106, located in the lower right-hand corner of image 100. Upon raster scanning pixel 106, the image projector stops raster scanning and returns to pixel 102 to repeat the raster scanning process described above. In this manner, the image projector continually generates and updates image 100.

Now referring to FIG. 1B, which is a diagram illustrating a prior art manner of generating a typical large area display 120 by tiling projected images 100, 122, 124, and 126, which in combination result in a large viewable image. It should be appreciated that four image projectors (not shown) are utilized to generate projected images 100, 122, 124, and 126. Furthermore, it should be appreciated that each image projector generates one of projected images 100, 122, 124, and 126. It should be further appreciated that projected images 122–126 are each generated in the same manner as projected image 100, as described above. Specifically, at time equal to zero, all four image projectors simultaneously begin raster scanning, from left to right, the top rows of pixels of projected images 100, 122, 124, and 126. Furthermore, the image projectors raster scan the rows of pixels of images 100, 122, 124, and 126 from top to bottom. Once the bottom rows of pixels of images 100, 122, 124, and 126 are raster scanned, the image projectors repeat this process in order to continuously update and generate large area display 120.

There are disadvantages associated with the prior art technique of tiling multiple image projectors to generate a large area display, as described above. One of the main disadvantages is that it produces images exhibiting visual defects or anomalies which are particularly evident along the horizontal seams located between the projected images (e.g., 100, 122, 124, and 126). Furthermore, these visual anomalies are more pronounced when certain images (e.g., visual simulation) are being displayed. The occurrence of these visual anomalies are attributed to the fact that the pixels near the horizontal seams are temporally out of phase.

For example, as the lower rows of pixels of images 100 and 122 are raster scanned displaying the end of a frame of data, the upper rows of pixels of images 124 and 126 are raster scanned around the same time displaying the beginning of a subsequent frame of data. As such, two different frames of data coexist near the horizontal seam of images 100, 122, 124 and 126. Therefore, the pixels near the horizontal seam of images 100, 122, 124, and 126 are temporally out of phase. As such, an image appears to "tear" as it is displayed moving horizontally across large area display 120 along the horizontal seam between images 100, 122, 124, and 126 because the human eye integrates the image generated by pixels that are illuminated at approximately the same time (see FIG. 1C). Pixel 106 is illuminated near the end of each frame, whereas pixel 128 is illuminated near the start of each frame. As such, it is apparent in FIG. 1C that the image information for frame 0 for pixel 106 will get integrated with frame 1 information for pixel 128. This means that an object that is moving horizontally along the horizontal seam will have some pixels from one frame and other pixels sampled from the subsequent frame. The motion of the object will tear the overall image. Note that the pixel is really only bright when the scan beam hits the pixel, then the phosphor's light emission decays fairly rapidly. Much of the image retention is in the workings of the human eye. In other words, psycho-visual anomalies are generated by this prior art tiling technique since the pixels near the horizontal seams are temporally out of phase.

Accordingly, a need exists for a method and system for tiling multiple image projectors to generate a large area display of moving images and data which does not exhibit visual defects or anomalies.

DISCLOSURE OF THE INVENTION

The present invention provides a method and system for tiling multiple image projectors to generate a large area display of moving images and data which is free of visual defects or anomalies. Therefore, the present invention is able to produce large area displays exhibiting more realistic and lifelike images thereby improving the viewing experience of the viewer.

Specifically, one embodiment of the present invention includes a system for generating a large area display of moving data. The system comprises a display image generator for rendering pixels of an image to be displayed as the large area display. Furthermore, a plurality of tiled image projectors are coupled to the display image generator to receive pixel data and to generate the large area display. The plurality of tiled image projectors comprise at least two image projectors. A first image projector which performs a first type of raster scanning sequence to display a first portion of the pixel data. Moreover, a second image projector which performs a second type of raster scanning sequence to display a second portion of the pixel data, wherein the second type of raster scanning sequence is different than the first type of raster scanning sequence.

In another embodiment, the system comprises a display image generator for rendering pixels of an image to be displayed as the large area display. The display image generator comprises a host processor having an application program issuing graphics commands and a geometry circuit coupled to the host processor for processing primitives. Furthermore, the display image generator also comprises a rasterizer circuit coupled to the geometry circuit for generating pixel data and a frame buffer coupled to the rasterizer circuit which stores the pixel data. Moreover, the display image generator also comprises a display interface circuit coupled to the rasterizer circuit to output the pixel data. The system also comprises a plurality of tiled image projectors coupled to the display interface circuit to receive the pixel data and to generate the large area display. The plurality of tiled image projectors comprise at least two image projectors. A first image projector which performs a first type of raster scanning sequence to display a first portion of the pixel data. Furthermore, a second image projector which performs a second type of raster scanning sequence to display a second portion of the pixel data, wherein the second type of raster scanning sequence is different than the first type of raster scanning sequence. It should be appreciated that the display interface circuit is able to access the pixel data from the frame buffer in any order or sequence (e.g., reverse order) for output to the plurality of tiled image projectors.

In still another embodiment, the present invention includes a method for generating a large area display of moving data. The method comprises the step of rendering pixels of an image to be displayed as the large area display. The method also includes the step of storing pixel data within a memory device. Another step of the method includes outputting a first and second portions of the pixel data to a plurality of tiled image projectors. The method also includes the step of performing a first type of raster scanning sequence to display the first portion of the pixel data. Another step of the method includes performing a second type of raster scanning sequence to display the second portion of the pixel data, wherein the second type of raster scanning sequence is different than the first type of raster scanning sequence.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detail description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
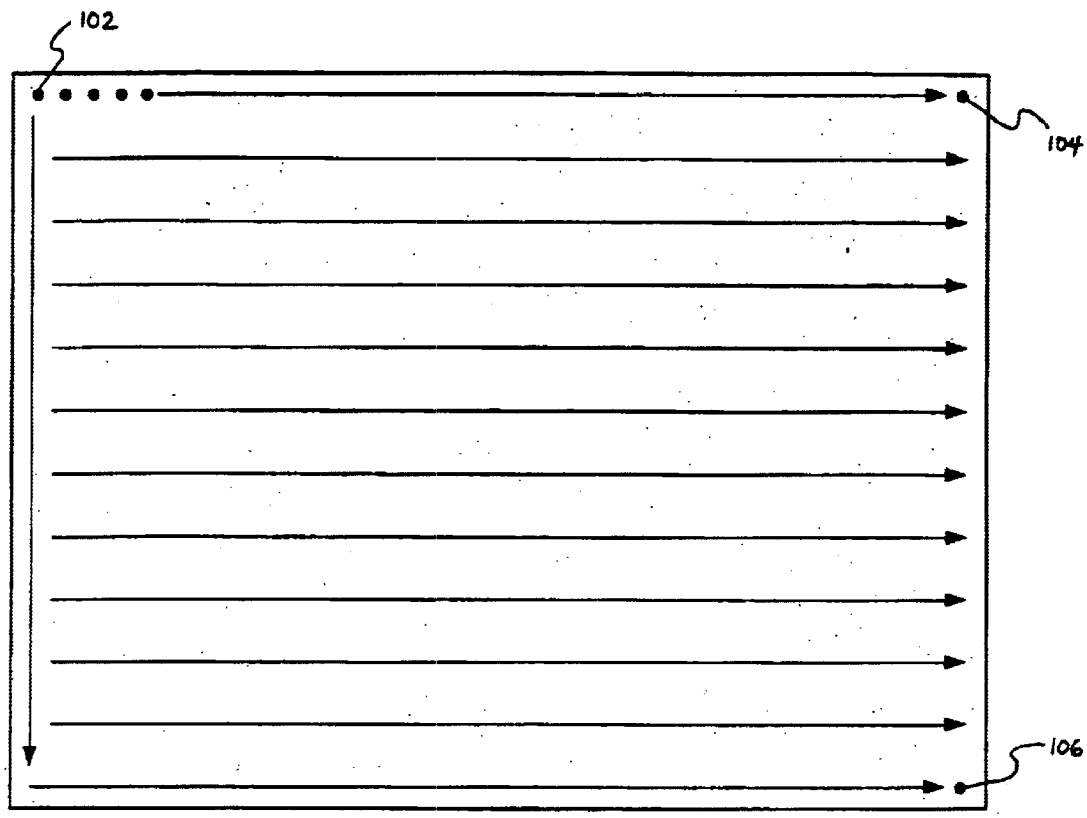
FIG. 1A is a diagram illustrating the manner in which a projected image is typically generated by a prior art image projector.
Figure 1B:
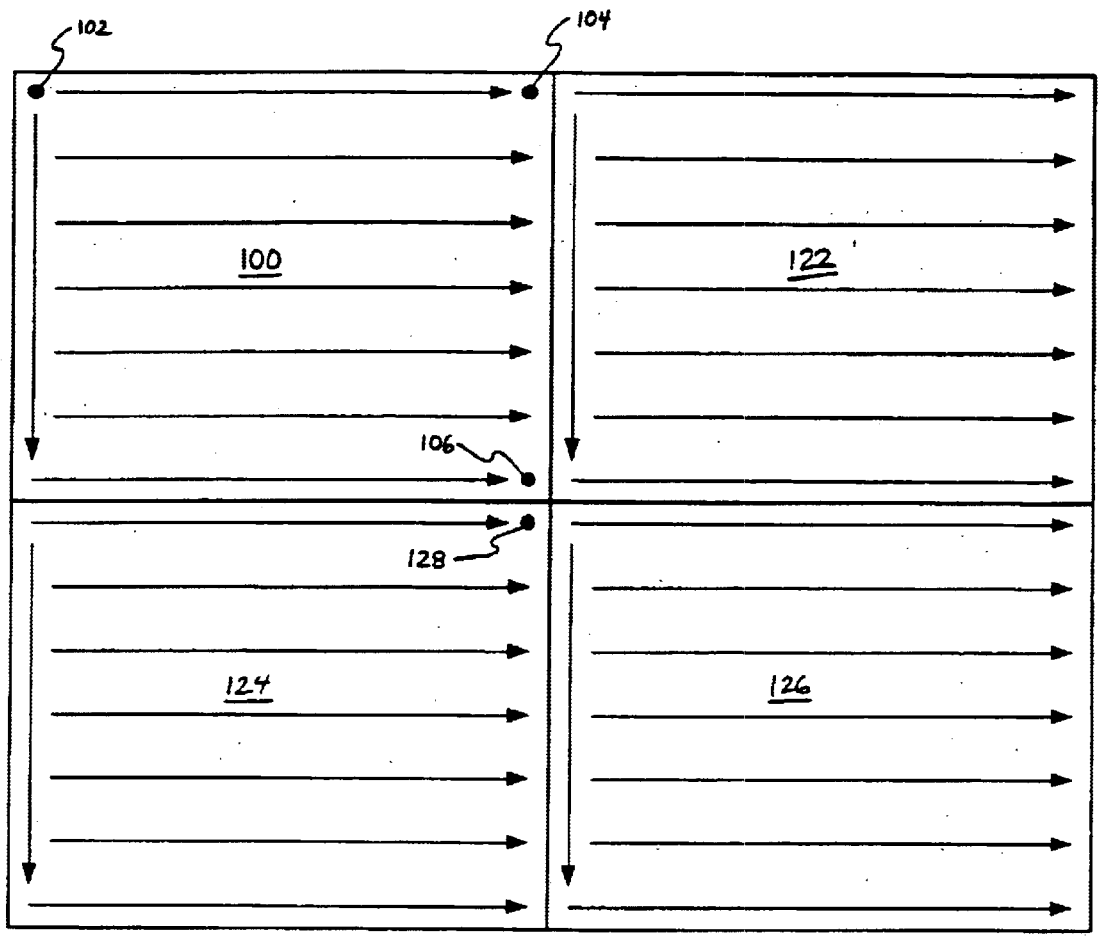
FIG. 1B is a diagram illustrating a prior art manner of generating a typical large area display by tiling four projected images.
Figure 1C:
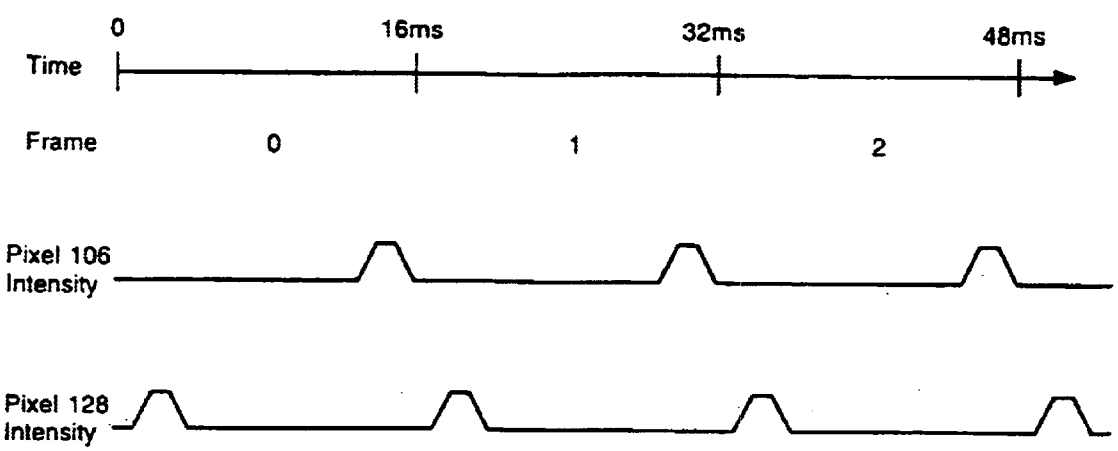
FIG. 1C is a chart illustrating the timing and intensity of two specific pixels within prior art FIG. 1B.
Figure 2:
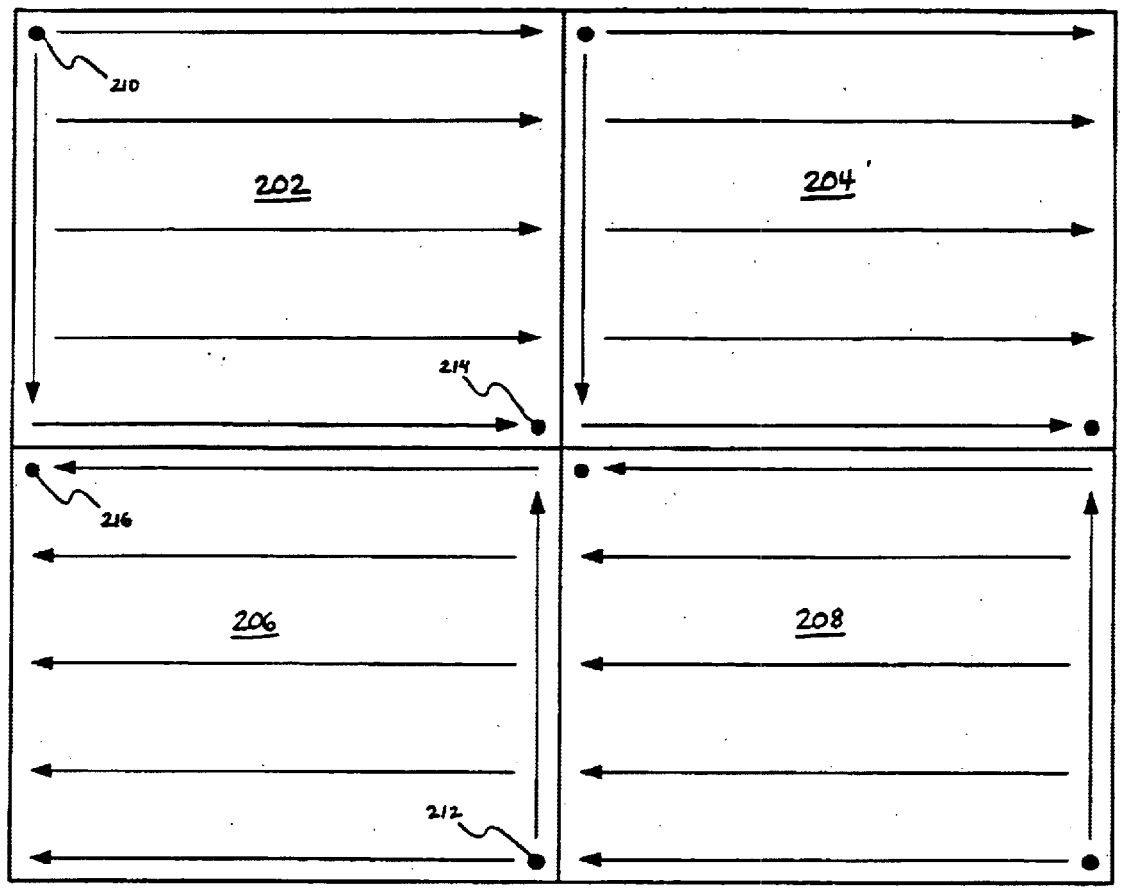
FIG. 2 is a diagram illustrating one embodiment in accordance with the present invention for generating a large area display by tiling four projected images.

Referring now to FIG. 2, which is a diagram illustrating one embodiment in accordance with the present invention for generating a large area display 200 by tiling projected images 202–208, which in combination result in a large viewable image. It should be appreciated that four separate image projectors (not shown) are utilized to generate projected images 202–208. Furthermore, it should be appreciated that each image projector generates one of the projected images 202–208 within the present embodiment. Specifically, projected images 202 and 204 are each generated by one type of raster scanning sequence while projected images 206 and 208 are each generated by another type of raster scanning sequence. As such, large area display 200 is free of visual defects and anomalies along the horizontal and vertical seams of projected images 202–208. Therefore, within the present embodiment, the horizontal and vertical seams of large area display 200 are undetectable by a viewer.

Within the present embodiment, projected images 202 and 204 are generated by two separate image projectors, each performing the same raster scanning sequence relative to a projection surface. For example, when generating projected image 202 of large area display 200, the image projector raster scans or "draws" the pixels in a row, from left to right. Moreover, the image projector raster scans the rows of pixels of projected image 202 from top to bottom. Once the bottom row of pixels is completely raster scanned, the image projector returns to the upper left-hand corner of projected image 202 to begin raster scanning the top row of pixels again. In this manner, the image projector continually generates and updates projected image 202 by repeating this raster scanning sequence.

Specifically, to generate projected image 202, the image projector starts raster scanning pixel 210, which is located in the upper left-hand corner of image 202. The image projector proceeds to raster scan all of the pixels located in the top row of. projected image 202, from left to right. Upon reaching the right most pixel of the top row, the image projector stops raster scanning and proceeds to the left-hand edge of projected image 202 to begin raster scanning the next row of pixels. The image projector continues this process for each subsequent row of pixels until it reaches pixel 214, located in the lower right-hand corner of projected image 202. Upon raster scanning pixel 214, the image projector stops raster scanning and returns to pixel 210 to repeat this raster scanning sequence. In this manner, the image projector continually generates and updates projected image 202. It is appreciated that projected image 204 is generated by another image projector utilizing the same type of raster scanning sequence used to generate projected image 202, as described above.

Referring still to FIG. 2, projected images 206 and 208 are also generated by two separate image projectors, each performing the same raster scanning sequence relative to the projection surface. For instance, when generating projected image 206, the image projector raster scans the pixels in a row, from right to left. Moreover, the image projector raster scans the rows of pixels of projected image 206 from bottom to top. Once the top row of pixels is completely raster scanned, the image projector then returns to the lower right-hand corner of projected image 206 to begin raster scanning the bottom row of pixels again. In this fashion, the image projector continually generates and updates projected image 206 by repeating this raster scanning sequence.

Specifically, to generate projected image 206, the image projector starts raster scanning pixel 212, which is located in the lower right-hand corner of image 206. The image projector proceeds to raster scan all of the pixels located in the bottom row of projected image 206, from right to left. Upon reaching the left most pixel of the bottom row, the image projector stops raster scanning and proceeds to the right-hand edge of projected image 206 to begin raster scanning the next row of pixels. The image projector continues this process for each subsequent row of pixels until it reaches pixel 216, located in the upper left-hand corner of projected image 206. Upon raster scanning pixel 216, the image projector stops raster scanning and returns to pixel 212 to repeat this raster scanning sequence. In this manner, the image projector continually generates and updates projected image 206. It is appreciated that projected image 208 is generated by another image projector utilizing the same type of raster scanning sequence used to generate projected image 206, as described above.

Therefore, large area display 200 of FIG. 2 is generated as four image projectors produce projected images 202–208. That is, at time equal to zero, all four image projectors simultaneously begin raster scanning projected images 202–208. Specifically, two image projectors begin raster scanning projected images 202 and 204 from left to right and from top to bottom relative to the projection surface. Simultaneously, two image projectors begin raster scanning projected images 206 and 208 from right to left and from bottom to top relative to the projection surface. Once projected images 202–208 are completely scanned, the image projectors repeat their particular type of raster scanning sequence in order to continuously update and generate large area display 200. By generating large area display 200 in this manner, pixels in the same proximity are raster scanned at about the same time along the horizontal and vertical seams of projected images 202–208. As such, when moving images and data are displayed on large area display 200, they are free of visual defects and anomalies along the horizontal and vertical seams. Therefore, the displayed images and data appear more realistic while the horizontal and vertical seams are unnoticeable to a viewer.

It should be appreciated that an image projector can be implemented in many different ways in accordance with the present invention. For example, an image projector can be implemented as an electron beam scanning device, a cathode ray tube (CRT), a liquid crystal display (LCD), a plasma display, a laser based system, and the like. As such, the present invention is not limited by the manner an image projector is implemented. Note that in this embodiment, the image projectors used to generate images 206 and 208 are realized by simply rotating image projectors identical to those used to generate images 202 and 204 by 180 degrees. This means that the image projector proper needs no special hardware, and the present embodiment may be implemented entirely within an image generator source (e.g., a computer). In this case, the image generator need only be able to order the data from the bottom right to the upper left corners of the screen space for images 206 and 208.

Figure 3:
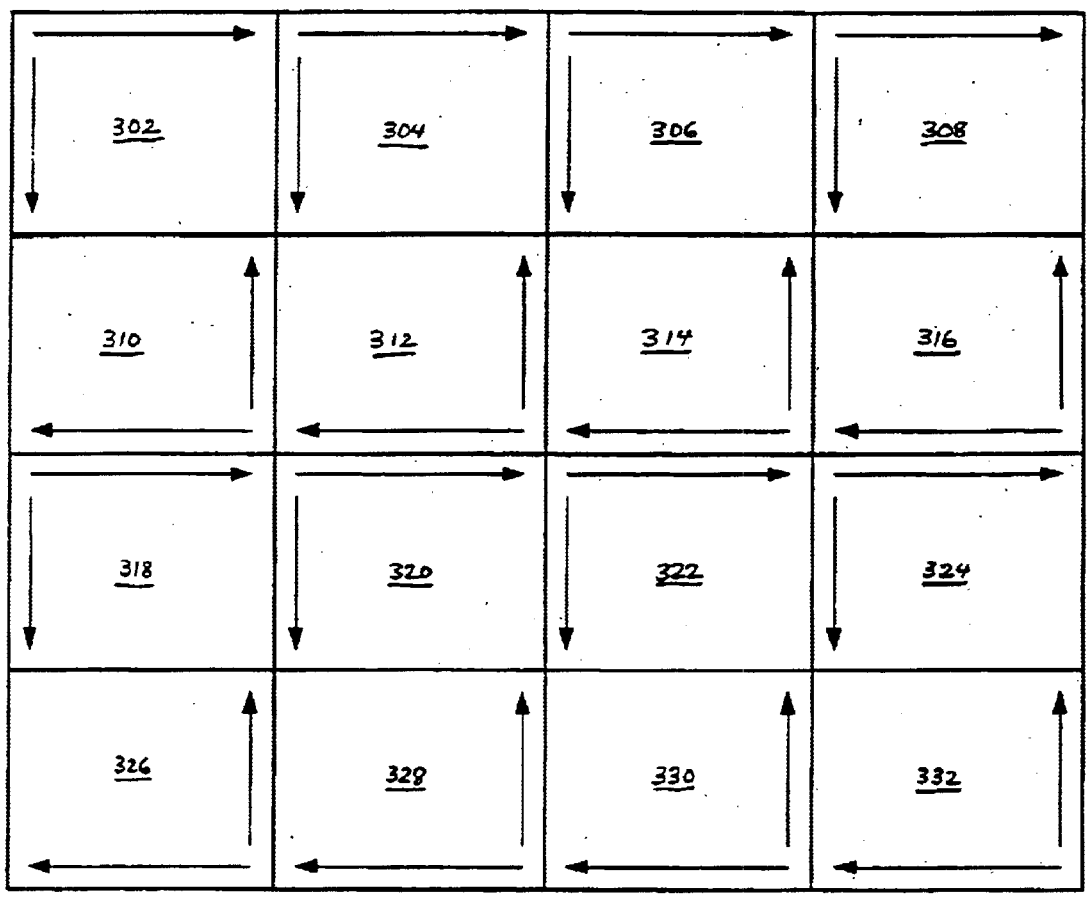
FIG. 3 is a diagram illustrating one embodiment in accordance with the present invention for generating a large area display by tiling sixteen projected images.

Referring now to FIG. 3, which is a diagram illustrating one embodiment in accordance with the present invention for generating a large area display 300 by tiling sixteen projected images, which in combination result in a large viewable image. It should be appreciated that the manner of generating large area display 300 is similar to the manner of generating large area display 200 of FIG. 2. Within the present embodiment, sixteen separate image projectors (not shown) are utilized to generate projected images 302–332. Furthermore, each image projector generates one of projected images 302–332. Specifically, the odd rows of projected images of large area display 300 are each generated by one type of raster scanning sequence while the even rows of projected images are each generated by another type of raster scanning sequence. That is, the first and third rows of projected images (e.g., 302–308 and 318–324) are each generated by one type of raster scanning sequence. Furthermore, the second and fourth rows of projected images (e.g., 310–316 and 326–332) are each generated by another type of raster scanning sequence. Generated in this fashion, large area display 300 is free of visual defects and anomalies.

Within the present embodiment, the raster scanning sequence used by an image projector to generate projected image 202 of FIG. 2, as described above, is the same type of raster scanning sequence used by the four image projectors to generate projected images 302–308. As such, projected images 302–308 are each generated by an image projector which raster scans from left to right and from top to bottom relative to a projection surface. Furthermore, it should be appreciated that projected images 318–324 are each generated by an image projector which raster scans from left to right and from top to bottom, as described above.

With reference still to FIG. 3, the raster scanning sequence used by an image projector to generate projected image 206, as described above, is the same type of raster scanning sequence used by the four image projectors to generate projected images 310–316. As such, projected images 310–316 are each generated by an image projector which raster scans from right to left and from bottom to top relative to the projection surface. Additionally, it should be appreciated that projected images 326–332 are each generated by an image projector which raster scans from right to left and from bottom to top, as described above. Therefore, by generating large area display 300 in this manner, pixels in the same proximity are raster scanned at about the same time along the horizontal and vertical seams of projected images 302–332. As such, when moving images and data are displayed on large area display 300, they are free of visual defects and anomalies along the horizontal and vertical seams.

Figure 4:
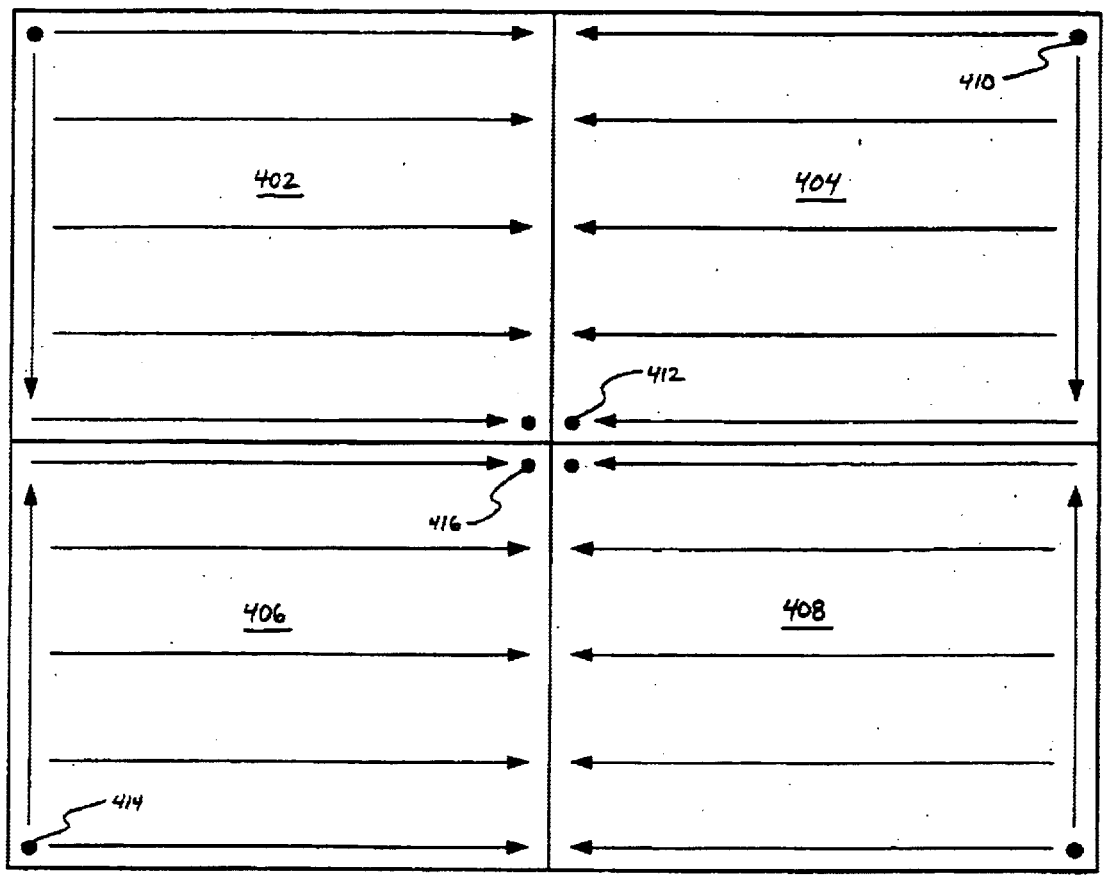
FIG. 4 is a diagram illustrating another embodiment in accordance with the present invention for generating a large area display by tiling four projected images.

With reference now to FIG. 4, which is a diagram illustrating one embodiment in accordance with the present invention for generating a large area display 400 by tiling projected images 402–408, which in combination result in a large viewable image. Four separate image projectors (not shown) are utilized to generate projected images 402–408. Moreover, each image projector generates one of the projected images 402–408 within the present embodiment. Specifically, each of projected images 402–408 is generated by a different type of raster scanning sequence. As such, large area display 300 is free of visual defects and anomalies along the horizontal and vertical seams of projected images 402–408.

Within the present embodiment, projected image 402 is generated by an image projector performing the same type of raster scanning sequence used to generate projected image 202 of FIG. 2, as described above. That is, an image projector generates projected image 402 by performing a raster scanning sequence from left to right and from top to bottom relative to a projection surface. Furthermore, projected image 408 is generated by an image projector performing the same type of raster scanning sequence used to generate projected image 206 of FIG. 2, as described above. Particularly, an image projector generates projected image 408 by performing a raster scanning sequence from right to left and from bottom to top relative to the projection surface. Moreover, projected images 404 and 406 are generated by two separate image projectors, each performing a different type of raster scanning sequence which has not been described above.

Specifically, when generating projected image 404 of large area display 400, the image projector raster scans the pixels in a row, from right to left. Moreover, the image projector raster scans the rows of pixels of projected image 404 from top to bottom. Once the bottom row of pixels is completely raster scanned, the image projector returns to the upper right-hand corner of projected image 404 to begin scanning the top row of pixels again. In this manner, the image projector continually generates and updates projected image 404 by repeating this raster scanning sequence relative to the projection surface.

More specifically, to generate projected image 404, the image projector starts raster scanning pixel 410, which is located in the upper right-hand corner of image 404. The image projector proceeds to raster scan all of the pixels located in the top row of projected image 404, from right to left. Upon reaching the left most pixel of the top row, the image projector stops raster scanning and proceeds to the right-hand edge of projected image 404 to begin raster scanning the next row of pixels. The image projector continues this process for each subsequent row of pixels until it reaches pixel 412, located in the lower left-hand corner of projected image 404. Upon raster scanning pixel 412, the image projector stops raster scanning and returns to pixel 410 to repeat this raster scanning sequence.

Referring still to FIG. 4, when generating projected image 406 of large area display 400, the image projector raster scans the pixels in a row, from left to right. Moreover, the image projector raster scans the rows of pixels of projected image 406 from bottom to top. Once the top row of pixels is completely raster scanned, the image projector then returns to the lower left-hand corner of projected image 406 to begin raster scanning the bottom row of pixels again. In this fashion, the image projector continually generates and updates projected image 406 by repeating this raster scanning sequence relative to the projection surface.

Specifically, to generate projected image 406, the image projector starts raster scanning pixel 414, which is located in the lower left-hand corner of image 406. The image projector proceeds to raster scan all of the pixels located in the bottom row of projected image 406, from left to right. Upon reaching the right most pixel of the bottom row, the image projector stops raster scanning and proceeds to the left-hand edge of projected image 406 to begin raster scanning the next row of pixels. The image projector continues this process for each subsequent row of pixels until it reaches pixel 416, located in the upper right-hand corner of projected image 406. Upon raster scanning pixel 416, the image projector stops raster scanning and returns to pixel 414 to repeat this raster scanning sequence.

Therefore, large area display 400 of FIG. 4 is generated as four image projectors produce projected images 402–408. Particularly, at time equal to zero, all four image projectors simultaneously begin raster scanning projected images 402–408. Specifically, one image projector begins raster scanning projected image 402 from left to right and from top to bottom relative to the projection surface at the same time a second image projector begins raster scanning projected image 404 from right to left and from top to bottom. Simultaneously, a third image projector begins raster scanning projected image 406 from left to right and from bottom to top relative to the projection surface at the same time a fourth image projector begins raster scanning projected image 408 from right to left and from bottom to top. Once projected images 402–408 are completely raster scanned, the image projectors repeat their particular type of raster scanning sequence in order to continuously update and generate large area display 400. By generating large area display 400 in this fashion, pixels in the same proximity are raster scanned virtually at the same time along the horizontal and vertical seams of projected images 402–408. In other words, projected images 402–408 are temporally in phase with each other as they are raster scanned. As such, when moving images and data are displayed on large area display 400, they are free of visual defects and anomalies along the horizontal and vertical seams. Therefore, the displayed moving images and data appear more realistic while the horizontal and vertical seams are unnoticeable to a viewer.

Figure 5:
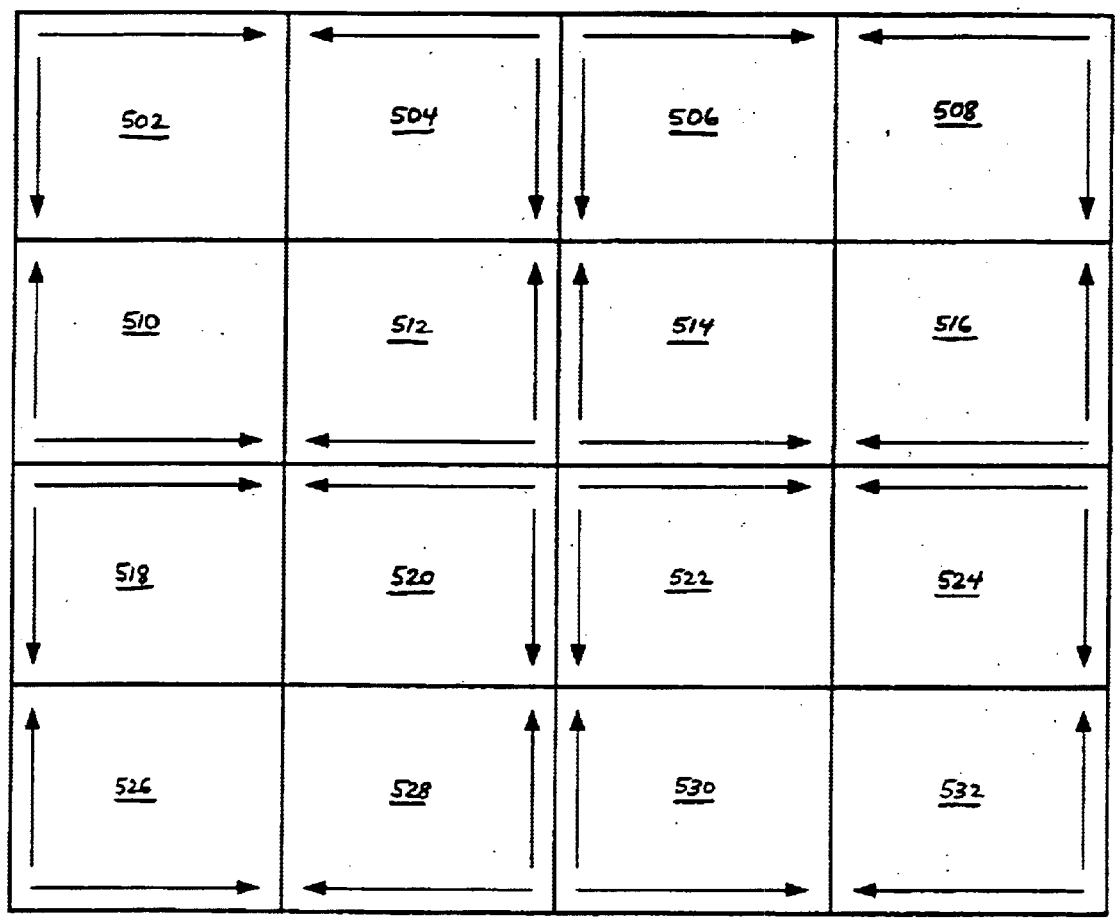
FIG. 5 is a diagram illustrating another embodiment in accordance with the present invention for generating a large area display by tiling sixteen projected images.

Referring now to FIG. 5, which is a diagram illustrating one embodiment in accordance with the present invention for generating a large area display 500 by tiling sixteen projected images, which in combination result in a large viewable image. It should be appreciated that the manner of generating large area display 500 is similar to the manner of generating large area display 400 of FIG. 4. Within the present embodiment, sixteen separate image projectors (not shown) are utilized to generate projected images 502–532. Furthermore, each image projector generates one of projected images 502–532. Specifically, projected images 502, 506, 518, and 522 are each generated by a first type of raster scanning sequence while projected images 504, 508, 520, and 524 are generated by a second type of raster scanning sequence. Moreover, projected images 510, 514, 526, and 530 are generated by a third type of raster scanning sequence while projected images 512, 516, 528, and 532 are generated by a fourth type of raster scanning sequence. Generated in this manner, large area display 500 is free of visual defects and anomalies.

Within the present embodiment, the raster scanning sequence used by an image projector to generate projected image 402 of FIG. 4, as described above, is the same type of raster scanning sequence used by the four image projectors to generate projected images 502, 506, 518, and 522. As such, projected images 502, 506, 518, and 522 are each generated by an image projector which raster scans from left to right and from top to bottom relative to a projection surface. Furthermore, the raster scanning sequence used by an image projector to generate projected image 404 of FIG. 4, as described above, is the same type of raster scanning sequence used by the four image projectors to generate projected images 504, 508, 520, and 524. As such, projected images 504, 508, 520, and 524 are each generated by an image projector which raster scans from right to left and from top to bottom relative to the projection surface.

With reference still to FIG. 5, the raster scanning sequence used by an image projector to generate projected image 406 of FIG. 4, as described above, is the same type of raster scanning sequence used by the four image projectors to generate projected images 510, 514, 526, and 530. As such, projected images 510, 514, 526, and 530 are each generated by an image projector which raster scans from left to right and from bottom to top relative to the projection surface. Additionally, the raster scanning sequence used by an image projector to generate projected image 408 of FIG. 4, as described above, is the same type of raster scanning sequence used by the four image projectors to generate projected images 512, 516, 528, and 532. As such, projected images 512, 516, 528, and 532 are each generated by an image projector which raster scans from right to left and from bottom to top relative to the projection surface. By generating large area display 500 in this fashion, pixels in the same proximity are raster scanned virtually at the same time along the horizontal and vertical seams of projected images 502–532. In other words, projected images 502–532 are temporally in phase with each other as they are raster scanned. As such, when moving images and data are displayed on large area display 500, they are free of visual defects and anomalies along the horizontal and vertical seams. Therefore, the displayed moving images and data appear more realistic while the horizontal and vertical seams are unnoticeable to a viewer.

Figure 6:
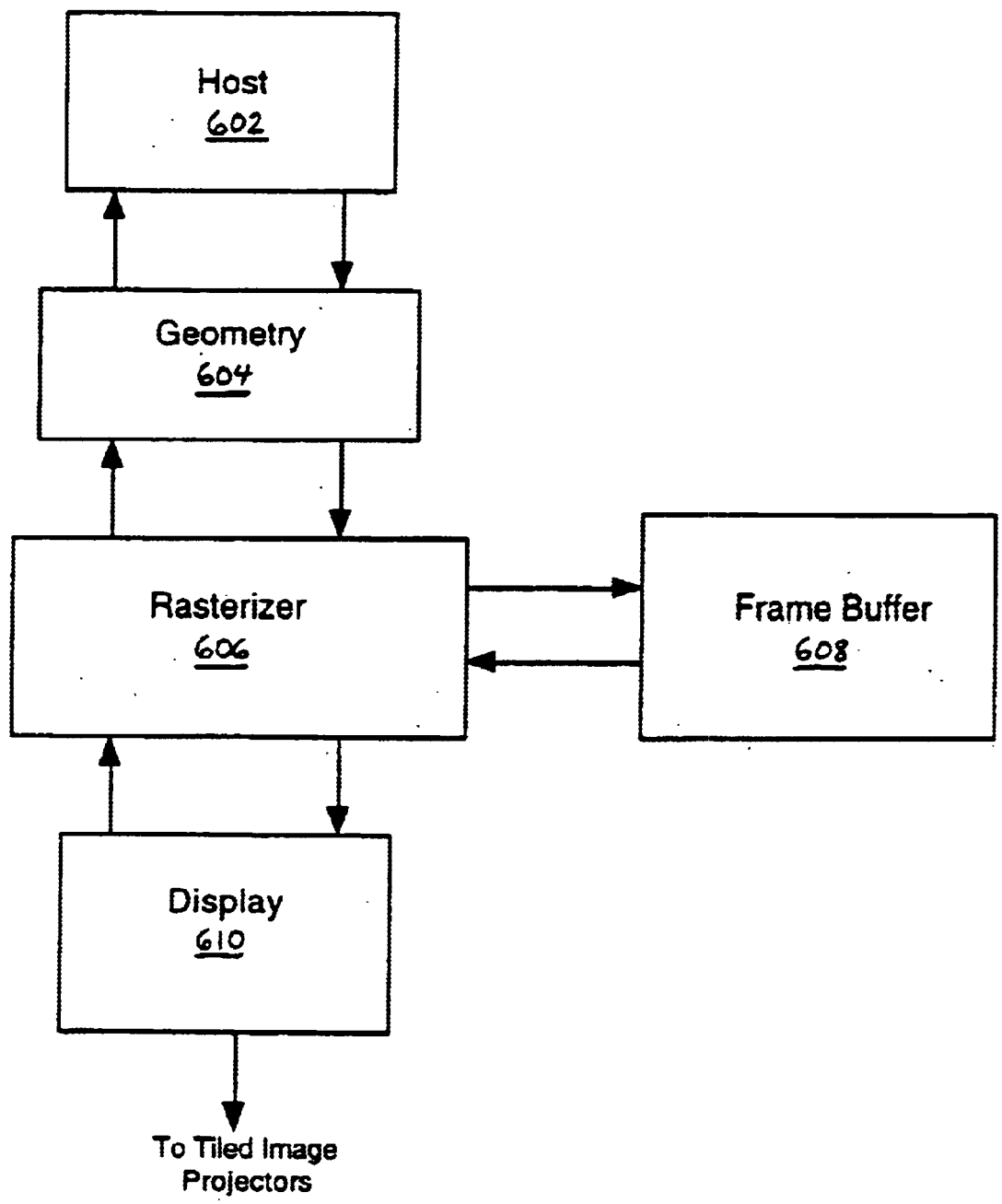
FIG. 6 is a block diagram of one embodiment of a display image generator in accordance with the present invention.

With reference now to FIG. 6, which is a block diagram of the currently preferred embodiment of a display image generator 600, in accordance with the present invention. An application program running on a host processor 602 directs the image rendering process for a large area display in accordance with the present invention (e.g., large area displays 200, 300, 400, and 500). The application program provides the high-level instructions and data to be used in the image rendering process. This information is passed on to a geometry engine circuit 604, which performs the arithmetic operations on vertices. The vertices are then filled by a rasterizer circuit 606. Rasterizer circuit 606 performs color, blending, anti-aliasing, scan-conversion, depth, texture, lighting, and fog functions. The final pixel values are stored within a frame buffer 608, which is implemented within the present embodiment using random access memory (RAM). Display interface circuit 610 controls the movement of the pixel data from frame buffer 608 to the individual image projectors. It should be understood that display image generator 600 of the present embodiment is a computer system. It should be noted that display image generator 600 can have many different types of configurations in accordance with the present invention. It should be further appreciated that whereas in the preferred embodiment, a single display image generator 600 is used to control all image projectors for a large area display, multiple display image generator 600 units may be used to control individual or groups of image projectors for a single large area display.

Within the present embodiment, display interface circuit 610 has the ability to retrieve the appropriate pixel data values from frame buffer 608 when requested, as mentioned above. Specifically, display interface circuit 610 retrieves pixel data appropriate for each image projector, since each image projector generates a different portion of the large area display. Furthermore, display interface circuit 610 is able to access the pixel data stored within frame buffer 608 in any particular order or sequence. As such, display interface circuit 610 is able to subsequently output pixel data in a wide variety of sequences. That is, display interface circuit 610 outputs pixel data in a sequence which mirrors the type of raster scanning sequence a particular image projector uses to generate a projected image. Therefore, if an image projector is using a right to left and bottom to top raster scanning sequence, display interface circuit 610 mirrors that sequence when outputting the appropriate pixel data to that image projector. In this fashion, all of the pixels of each projected image are properly oriented during the generation of a large area display. Alternatively, geometry engine circuit 604 and rasterizer circuit 606 of display image generator 600 may be used to mirror the image associated with each subregion in frame buffer 608, such that no reordering is necessary on the part of display interface circuit 610 The former embodiment is preferred, however, since it is simple to implement and requires no additional programming in the image generation process.

Figure 7:
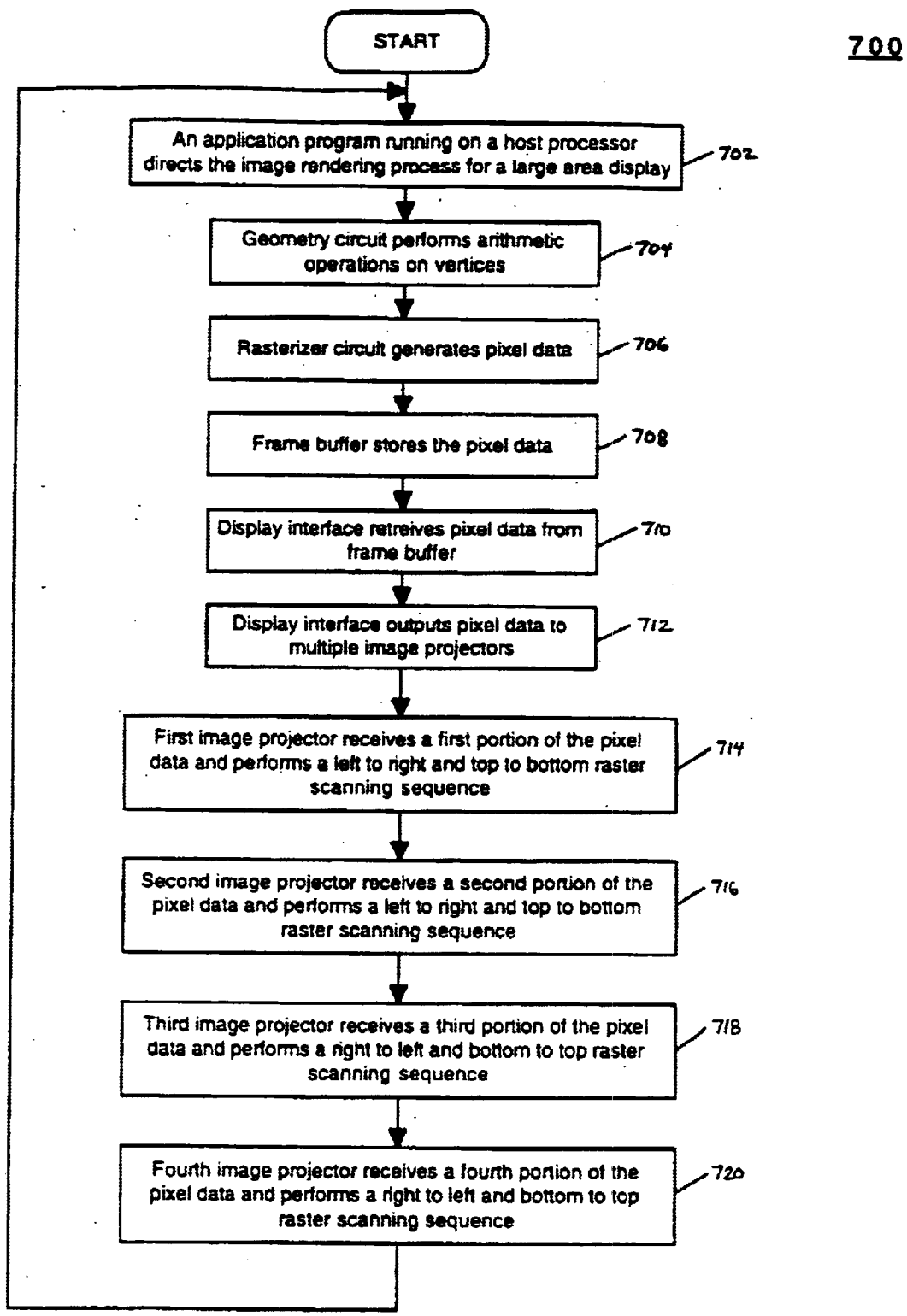
FIG. 7 is a flowchart in accordance with one embodiment of the present invention for generating a large area display by tiling four projected images.

Referring now to FIG. 7, which is a flowchart 700 in accordance with one embodiment of the present invention for generating a large area display by tiling projected images, which in combination result in a large viewable image. Flowchart 700 includes processes of the present invention which, in one embodiment, are carried out by a host processor under the control of an application program.

Although specific steps are disclosed in flowchart 700, such steps are exemplary. That is, the present invention is well suited to performing various other steps or variations of the steps recited in FIG. 7.

In step 702, within the present embodiment, an application program running on a host processor directs the image rendering process for a large area display that is generated by four image projectors. The application program provides the high-level instructions and data to be used in the image rendering process. This information is passed on to a geometry engine circuit. At step 704, the geometry engine circuit of the present embodiment performs the arithmetic operations on vertices. In step 706, a rasterizer circuit generates pixel data for the images. That is, the vertices are filled by the rasterizer circuit. Furthermore, the rasterizer circuit performs color, blending, antialiasing, scan-conversion, depth, texture, lighting, and fog functions. At step 708, the final pixel values are stored within a frame buffer.

In step 710 of FIG. 7, a display interface circuit retrieves the appropriate pixel data values from the frame buffer when requested. Specifically, within step 710, the display interface circuit retrieves pixel data appropriate for each image projector, since each image projector generates a different portion of the large area display. Furthermore, within step 710, the display interface circuit is able to access the pixel data stored within the frame buffer in any particular order or sequence. As such, the display interface circuit is able to subsequently output pixel data in a wide variety of sequences. At step 712, the display interface circuit outputs pixel data to the four image projectors of the present embodiment. Within step 712, the display interface circuit of the present embodiment outputs pixel data in a sequence which mirrors the type of raster scanning sequence a particular image projector uses to generate a projected image. Therefore, if an image projector is using a right to left and top to bottom raster scanning sequence, the display interface circuit mirrors that sequence when outputting the appropriate pixel data to that image projector.

In step 714, a first image projector receives a first portion of the pixel data from the display interface circuit in a first sequence. Within step 714, the first image projector displays the pixel data using a left to right and top to bottom raster scanning sequence relative to a projection surface. At step 716, a second image projector receives a second portion of the pixel data from the display interface circuit in a first sequence. Within step 716, the second image projector displays the pixel data using a left to right and top to bottom raster scanning sequence relative to the projection surface. In step 718, a third image projector receives a third portion of the pixel data from the display interface circuit in a second sequence. Within step 718, the third image projector displays the pixel data using a right to left and bottom to top raster scanning sequence relative to the projection surface. In step 720, a fourth image projector receives a fourth portion of the pixel data from the display interface circuit in a second sequence. Within step 720, the fourth image projector displays the pixel data using a right to left and bottom to top raster scanning sequence relative to the projection surface. Once step 720 is completed, the present embodiment returns to step 702.

Thus, the present invention provides a method and system for tiling multiple image projectors to generate a large area display of moving images and data which is free of visual defects or anomalies. As such, the present invention is able to produce large area displays exhibiting more realistic and lifelike images thereby improving the viewing experience of the viewer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for generating a large area display of data on a projection surface, said system comprising:
   a display image generator for rendering pixels of an image to be displayed as said large area display; and
   a plurality of tiled image projectors coupled to said display image generator to receive pixel data and to generate said large area display, wherein said plurality of tiled image projectors comprise:
   a first image projector that performs a first raster scanning sequence to display a first portion of said pixel data as a first projected image; and
   a second image projector that performs a second raster scanning sequence to display a second portion of said pixel data as a second projected image,
   wherein a seam is defined between said first projected image and said second projected image, and wherein said first image projector starts performing said first raster scanning sequence at a first pixel location relative to said first displayed image and said second image projector starts performing said second raster scanning sequence at a second pixel location relative to said second displayed image, wherein said second pixel location is different from said first pixel location, such that pixels within said first portion are raster scanned along the seam at about the same time at which pixels within the second portion are raster scanned along the seam.

2. A system as described in claim 1, further comprising a third image projector that performs a third raster scanning to display a third portion of said pixel data as a third projected image, wherein said third image projector starts performing said third raster scanning sequence at a third pixel location relative to said third displayed image, and wherein said third pixel location is different from said first pixel location and said second pixel location.

3. A system as described in claim 2, further comprising a fourth image projector that performs a fourth raster scanning sequence to display a fourth portion of said pixel data as a fourth projected image, wherein said fourth image projector starts performing said fourth raster scanning sequence at a fourth pixel location relative to said fourth displayed image, and wherein said fourth pixel location is different from said first pixel location, said second pixel location, and said third pixel location.

4. A system as described in claim 1 wherein said first raster scanning sequence is from left to right and from top to bottom and said second raster scanning sequence is from right to left and from bottom to top.

5. A system as described in claim 1 wherein said first raster scanning sequence is from left to right and from top to bottom and said second raster scanning sequence is from left to right and from bottom to top.

6. A system as described in claim 1 wherein said first raster scanning sequence is from right to left and from top to bottom and said second raster scanning sequence is from right to left and from bottom to top.

7. A system as described in claim 1 wherein said first raster scanning sequence is from right to left and from top to bottom and said second raster scanning sequence is from left to right and from bottom to top.

8. A system as described in claim 1 wherein said display image generator outputs said first portion of said pixel data in a first sequence and said second portion of said pixel data in a second sequence, wherein said second sequence is different than said first sequence.

9. A system as described in claim 8 wherein said display image generator outputs a third portion of said pixel data in a third sequence, wherein said third sequence is different than said first sequence and said second sequence.

10. A system as described in claim 9 wherein said display image generator outputs a fourth portion of said pixel data in a fourth sequence, wherein said fourth sequence is different than said first sequence, said second sequence, and said third sequence.

11. A system as described in claim 1 wherein said display image generator comprises a computer system.

12. A system as described in claim 1 wherein said plurality of tiled image projectors comprises a cathode ray tube (CRT).

13. A system as described in claim 1 wherein said plurality of tiled image projectors comprises a liquid crystal display (LCD).

14. A system as described in claim 1 wherein said plurality of tiled image projectors comprises a plasma display.

15. A system as described in claim 1 wherein said plurality of tiled image projectors comprises a laser based system.

16. A system as described in claim 1 wherein said plurality of tiled image projectors comprises an electron beam scanning device.

17. A system as described in claim 1 wherein said display image generator comprises:
 a host processor having an application program issuing graphics commands;
 a geometry circuit coupled to said host processor for processing primitives;
 a rasterizer coupled to said geometry circuit for generating said pixel data;
 a memory device coupled to said rasterizer which stores said pixel data; and
 a display interface coupled to said rasterizer to output said pixel data to said plurality of tiled image projectors.

18. A system for generating a large area display of data on a projection surface, said system comprising:
 a display image generator for rendering pixels of an image to be displayed as said large area display, wherein said display image generator comprises:
  a host processor having an application program issuing graphics commands;
  a geometry circuit coupled to said host processor for processing primitives;
  a rasterizer circuit coupled to said geometry circuit for generating pixel data;
  a frame buffer coupled to said rasterizer circuit which stores said pixel data; and
  a display interface circuit coupled to said rasterizer circuit to output said pixel data; and
 a plurality of tiled image projectors coupled to said display interface circuit to receive said pixel data and to generate said large area display, wherein said plurality of tiled image projectors comprise:
  a first image projector that performs a first raster scanning sequence to display a first portion of said pixel data as a first projected image; and
  a second image projector that performs a second raster scanning sequence to display a second portion of said pixel data as a second projected image,
 wherein a seam is defined between said first projected image and said second projected image, and wherein said first image projector starts performing said first raster scanning sequence at a first pixel location relative to said first displayed image and said second image projector starts performing said second raster scanning sequence at a second pixel location relative to said second displayed image, wherein said second pixel location is different from said first pixel location, such that pixels within said first portion are raster scanned along the seam at about the same time at which pixels within the second portion are raster scanned along the seam.

19. A system as described in claim 18 wherein said first raster scanning sequence is from left to right and from top to bottom and said second raster scanning sequence is from right to left and from bottom to top.

20. A system as described in claim 18 wherein said first raster scanning sequence is from left to right and from top to bottom and said second raster scanning sequence is from left to right and from bottom to top.

21. A system as described in claim 18 wherein said first raster scanning sequence is from right to left and from top to bottom and said second raster scanning sequence is from right to left and from bottom to top.

22. A system as described in claim 18 wherein said first raster scanning sequence is from right to left and from top to bottom and said second raster scanning sequence is from left to right and from bottom to top.

23. A system as described in claim 18 wherein said display interface circuit outputs said first portion of said pixel data in a first sequence and said second portion of said pixel data in a second sequence, wherein said second sequence is different than said first sequence.

24. A system as described in claim 23 wherein said display interface circuit outputs a third portion of said pixel data in a third sequence, wherein said third sequence is different than said first sequence and said second sequence.

25. A system as described in claim 24 wherein said display interface circuit outputs a fourth portion of said pixel data in a fourth sequence, wherein said fourth sequence is different than said first sequence, said second sequence, and said third sequence.

26. A system as described in claim 18 wherein said display image generator comprises a computer system.

27. A system as described in claim 18 wherein said plurality of tiled image projectors comprises a cathode ray tube (CRT).

28. A system as described in claim 18 wherein said plurality of tiled image projectors comprises a liquid crystal display (LCD).

29. A system as described in claim 18 wherein said plurality of tiled image projectors comprises a plasma display.

30. A system as described in claim 18 wherein said plurality of tiled image projectors comprises a laser based system.

31. A system as described in claim 18 wherein said plurality of tiled image projectors comprises an electron beam scanning device.

32. A method for generating a large area display of data on a projection surface, said method comprising:
- rendering pixels of an image to be displayed as said large area display;
- storing pixel data within a memory device;
- outputting first and second portions of said pixel data to a plurality of tiled image projectors;
- performing a first raster scanning sequence to display said first portion of said pixel data as a first projected image; and
- performing a second raster scanning sequence to display said second portion of said pixel data as a second projected image, wherein a seam is defined between said first projected image and said second projected image, and wherein said first image projector starts performing said first raster scanning sequence at a first pixel location relative to said first displayed image and said second image projector starts performing said second raster scanning sequence at a second pixel location relative to said second displayed image, wherein said second pixel location is different from said first pixel location, such that pixels within said first portion are raster scanned along the seam at about the same time at which pixels within the second portion are raster scanned along the seam.

33. A method as described in claim 32 further comprising:
- executing an application program on a host processor which issues graphics commands;
- processing vertices by a geometry circuit coupled to said host processor;
- generating said pixel data through a rasterizer coupled to said geometry circuit; and
- storing said pixel data in a frame buffer coupled to said rasterizer.

34. A method as described in claim 32 wherein said first raster scanning sequence is from left to right and from top to bottom and said second raster scanning sequence is from right to left and from bottom to top.

35. A method as described in claim 32 wherein said first raster scanning sequence is from left to right and from top to bottom and said second raster scanning sequence is from left to right and from bottom to top.

36. A method as described in claim 32 wherein said first raster scanning sequence is from right to left and from top to bottom and said second raster scanning sequence is from right to left and from bottom to top.

37. A method as described in claim 32 wherein said first raster scanning sequence is from right to left and from top to bottom and said second raster scanning sequence is from left to right and from bottom to top.

38. A method as described in claim 32 wherein said outputting said pixel data to said plurality of tiled image projectors further comprises:
- outputting said first portion of said pixel data in a first sequence; and
- outputting said second portion of said pixel data in a second sequence, wherein said second sequence is different than said first sequence.

39. A display image generator for rendering pixels of an image to be displayed as a large area display, said display image generator comprising:
- a host processor having an application program issuing graphics commands;
- a geometry circuit coupled to said host processor for processing primitives;
- a rasterizer coupled to said geometry circuit for generating pixel data;
- a memory device coupled to said rasterizer which stores said pixel data; and
- a display interface coupled to said rasterizer to output said pixel data to be displayed as said large area display, wherein said display interface outputs a first portion of said pixel data in a first sequence and a second portion of said pixel data in a second sequence,
- wherein said second sequence is different from said first sequence such that a first image projector can start performing a first raster scanning sequence at a first pixel location relative to a first displayed image and a second image projector can start performing a second raster scanning sequence at a second pixel location relative to a second displayed image, wherein said second pixel location is different from said first pixel location, and such that pixels within said first portion can be raster scanned along a seam defined between said first displayed image and said second displayed image at about the same time at which pixels within the second portion are raster scanned along the seam.

40. A display image generator as described in claim 39 wherein said display interface outputs a third portion of said pixel data in a third sequence, wherein said third sequence is different than said first sequence and said second sequence.

41. A display image generator as described in claim 40 wherein said display interface outputs a fourth portion of said pixel data in a fourth sequence, wherein said fourth sequence is different than said first sequence, said second sequence, and said third sequence.

42. A display image generator as described in claim 39 wherein said display image generator comprises a computer system.

43. A plurality of tiled image projectors for generating a large area display, said plurality of tiled image projectors comprising:
- a first image projector that performs a first raster scanning sequence to display a first portion of said pixel data as a first projected image; and
- a second image projector that performs a second raster scanning sequence to display a second portion of said pixel data as a second projected image,
- wherein a seam is defined between said first projected image and said second projected image, and wherein said first image projector starts performing said first raster scanning sequence at a first pixel location relative to the first displayed image and said second image projector starts performing said second raster scanning sequence at a second pixel location relative to the second displayed image, wherein said second pixel location is different from said first pixel location, such that pixels within said first portion are raster scanned along the seam at about the same time at which pixels within the second portion are raster scanned along the seam.

44. A plurality of tiled image projectors as described in claim 43, further comprising a third image projector that performs a third raster scanning sequence to display a third portion of said pixel data as a third projected image, wherein said third image projector starts performing said third raster scanning sequence at a third pixel location relative to said third displayed image, and wherein said third pixel location is different from said first pixel location and said second pixel location.

45. A plurality of tiled image projectors as described in claim 44, further comprising a fourth image projector that performs a fourth raster scanning sequence to display a fourth portion of said pixel data as a fourth projected image, wherein said fourth image projector starts performing said fourth raster scanning sequence at a fourth pixel location relative to said fourth displayed image, and wherein said fourth pixel location is different from said first pixel location, said second pixel location, and said third pixel location.

46. A plurality of tiled image projectors as described in claim 43 wherein said first raster scanning sequence is from left to right and from top to bottom and said second raster scanning sequence is from right to left and from bottom to top.

47. A plurality of tiled image projectors as described in claim 43 wherein said first raster scanning sequence is from left to right and from top to bottom and said second raster scanning sequence is from left to right and from bottom to top.

48. A plurality of tiled image projectors as described in claim 43 wherein said first raster scanning sequence is from right to left and from top to bottom and said second raster scanning sequence is from right to left and from bottom to top.

49. A plurality of tiled image projectors as described in claim 43 wherein said first raster scanning sequence is from right to left and from top to bottom and said second raster scanning sequence is from left to right and from bottom to top.

50. A plurality of tiled image projectors as described in claim 43 wherein said first image projector comprises a cathode ray tube (CRT).

51. A plurality of tiled image projectors as described in claim 43 wherein said first image projector comprises a liquid crystal display (LCD).

52. A plurality of tiled image projectors as described in claim 43 wherein said first image projector comprises a plasma display.

53. A plurality of tiled image projectors as described in claim 43 wherein said first image projector comprises a laser based system.

54. A plurality of tiled image projectors as described in claim 43 wherein said first image projector comprises an electron beam scanning device.

* * * * *

UNITED STATES PATENT AND TRADEMARK OFFICE
CERTIFICATE OF CORRECTION

PATENT NO. : 6,774,868 B1
DATED : August 10, 2004
INVENTOR(S) : Andrew Bowen

It is certified that error appears in the above-identified patent and that said Letters Patent is hereby corrected as shown below:

Column 12,
Line 42, after "scanning" insert -- sequence --.

Column 15,
Line 55, after "comprises" insert -- the steps of --.

Signed and Sealed this

Third Day of May, 2005

JON W. DUDAS
*Director of the United States Patent and Trademark Office*